United States Patent [19]

Christenson et al.

[11] 4,222,911

[45] Sep. 16, 1980

[54] POLYESTER DIOL EXTENDED URALKYD RESIN AND COATING COMPOSITIONS CONTAINING THE SAME

[75] Inventors: Roger M. Christenson; J. Alden Erikson, both of Gibsonia, Pa.

[73] Assignee: PPG Industries, Inc., Pittsburgh, Pa.

[21] Appl. No.: 931,632

[22] Filed: Aug. 7, 1978

[51] Int. Cl.$^2$ .................... C09D 3/52; C09D 3/66; C09D 3/72

[52] U.S. Cl. ................... 260/22 TN; 260/21; 260/22 CQ

[58] Field of Search ............... 260/22 TN, 22 CQ, 21

[56] References Cited

U.S. PATENT DOCUMENTS

| | | | |
|---|---|---|---|
| 3,119,792 | 1/1964 | Schultheis et al. | 260/22 TN |
| 3,169,945 | 2/1965 | Hostettler et al. | 260/874 |
| 3,371,056 | 2/1968 | Delius | 260/22 TN |
| 3,501,425 | 3/1970 | Delius | 260/22 TN |
| 3,723,370 | 3/1973 | Watanabe et al. | 260/22 TN |
| 3,758,427 | 9/1973 | Katsibas | 260/19 EP |
| 3,804,920 | 4/1974 | Cunningham et al. | 260/31.2 N |
| 3,920,595 | 11/1975 | Anderson et al. | 260/22 TN |
| 3,962,521 | 6/1976 | Chang et al. | 428/423 |
| 3,962,522 | 6/1976 | Chang et al. | 428/423 |
| 4,026,850 | 5/1977 | Frank et al. | 260/22 TN |
| 4,056,493 | 11/1977 | Tsou | 260/22 TN |
| 4,098,743 | 7/1978 | Scriven et al. | 260/22 TN |
| 4,102,836 | 7/1978 | Johnson | 260/22 TN |

FOREIGN PATENT DOCUMENTS 1047046  11/1966  United Kingdom ............... 260/22 TN

*Primary Examiner*—Ronald W. Griffin
*Attorney, Agent, or Firm*—George D. Morris

[57] ABSTRACT

Coating compositions containing polyester diol extended uralkyd resins form flexible coatings. Such uralkyd resins are prepared by reacting oil modified alkyd resin, polyester diol having a number average molecular weight in the range of from about 800 to about 4000, and diisocyanate.

23 Claims, No Drawings

POLYESTER DIOL EXTENDED URALKYD RESIN AND COATING COMPOSITIONS CONTAINING THE SAME

Alkyd resins have been used as the binder or a portion of the binder in coating compositions. Many alkyd resins, unfortunately, cause the resultant coating to be brittle. Such brittle coatings are unsatisfactory when applied to substrates which flex in use.

The present invention provides uralkyd resins which are flexible and hence exhibit increased usefulness when incorporated into coatings. Accordingly, the present invention contemplates a polyester diol extended, ungelled, isocyanate free, uralkyd resin comprising the reaction product of (1) from about 60 to about 94 percent by weight of oil modified alkyd resin having an oil length of from about 30 to about 65 percent, (2) from about 3 to about 20 percent by weight of essentially nitrogen-free polyester diol having a number average molecular weight in the range of from about 800 to about 4000, and (3) from about 3 to about 20 percent by weight of diisocyanate.

In many situations, it is desirable that alkyd coating compositions not only provide flexible coatings, but that such compositions also be fast drying so that shortly after application, additional coats of the same or different coating composition can be applied. One such situation is the application of alkyd topcoat enamel to railway cars where short drying times are desired so that lettering can be stenciled over the topcoat soon after topcoat application. Unfortunately, alkyds which have this fast drying capability are quite brittle and have been found to fail where, as on railway rolling stock, the coated substrate is subject to flexure. To overcome this brittleness, drying oils of various lengths have been used to modify the alkyd to achieve more flexible coatings. However, when acceptable flexibility has been obtained, the drying time is unacceptably long.

The preferred embodiment provides uralkyd resins which are flexible and possess relatively short drying times. Such resins may be employed as binder in coating compositions where flexibility and short drying times are both desired. Accordingly, the preferred embodiment contemplates a polyester diol extended uralkyd resin comprising the reaction product of (1) from about 80 to about 94 percent by weight of air drying, oil modified alkyd resin having an oil length of from about 30 to about 65 percent, (2) from about 3 to about 10 percent by weight of essentially nitrogen-free polyester diol having a number average molecular weight in the range of from about 800 to about 4000, and (3) from about 3 to about 10 percent by weight of diisocyanate.

The oil modified alkyd resins employed in the invention are themselves conventional in the art. They are generally produced by reacting polyfunctional alcohol, polyfunctional acid or acid anhydride, and an oil or fatty acid.

Polyfunctional alcohols which can be used in preparing alkyd resins useful in this invention generally contain from 2 to about 12 carbon atoms. More usually, such polyfunctional alcohols contain from about 3 to about 6 carbon atoms. Examples of polyfunctional alcohols which can be used include ethylene glycol, propylene glycol, trimethylene glycol, diethylene glycol, 1,2-butanediol, 1,3-butanediol, 1,4-butanediol, 2,3-butanediol, neopentyl glycol, triethylene glycol, 1,6-hexanediol, dipropylene glycol, tetraethylene glycol, 2,2-dimethyl-3-hydroxypropyl 2,2-dimethyl-3-hydroxypropionate, glycerine, 1,1,1-trimethylolethane, 1,1,1-trimethylolpropane, erythritol, pentaerythritol, dipentaerythritol, sorbitol, mannitol and similar polyols. Mixtures of such polyfunctional alcohols may be used. It is preferred that the average functionality of the polyfunctional alcohol be in the range of from 2.5 to about 4 hydroxyl groups per molecule. Accordingly, when polyfunctional alcohols having greater average-functionality are used, it is preferred to react them with monobasic acid to produce polyfunctional alcohols having an average functionality within the stated range. Such reaction may be accomplished before or by adding the appropriate amount of acid to the charge, during formation of the alkyd resin. It is especially preferred that the average functionality of the polyhydric alcohol be 3 hydroxyl groups per molecule. Glycerine is the preferred polyfunctional alcohol.

Polyfunctional acids and acid anhydrides which can be used in preparing alkyd resins useful in this invention generally contain from 4 to about 36 carbon atoms. From 4 to about 12 carbon atoms is typical. More usually, such polyfunctional acids or acid anhydrides contain from about 6 to about 8 carbon atoms. Generally, the polyfunctional acids or acid anhydrides are aliphatic or aromatic polyfunctional acids or acid anhydrides. Examples of polyfunctional acids which can be used include succinic acid, glutaric acid, adipic acid, pimelic acid, suberic acid, azelaic acid, sebacic acid, phthalic acid, isophthalic acid, terephthalic acid, tetrahydrophthalic acid, hexahydrophthalic acid, chlorendic acid, tetrachlorophthalic acid, dimer acid, trimellitic acid, tricarballylic acid and the like. Occasionally, maleic acid, fumaric acid, glutaconic acid and similar acids are included. Anhydrides of such acids, where anhydrides exist can also be used. The preferred polyfunctional acid is isophthalic acid. The preferred acid anhydride is phthalic anhydride. Mixtures of polyfunctional acids, mixtures of acid anhydrides and mixtures of polyfunctional acids and acid anhydrides can be used. It is preferred that the average functionality of the polyfunctional acid be about 2 carboxyl groups per molecule. Polyfunctional acids having functionality greater than about 2 are generally used when the polyhydric alcohol discussed in the preceding paragraph has an average functionality of less than 3. Anhydrides are considered to have a functionality of 2 carboxyl groups per molecule.

The oil employed in preparing the alkyd resin can be drying oil, semi-drying oil, non-drying oil or a mixture thereof. Drying oil, semi-drying oil or a mixture thereof is preferred. Examples of drying oils or semi-drying oils that can be employed in preparing the alkyd resin include soya oil, segregated cottonseed oil, safflower oil, dehydrated castor oil, linseed oil, tung oil, grapeseed oil, hempseed oil, oiticica oil, poppyseed oil, rubberseed oil, soybean oil, sunflower oil, black walnut oil, perilla oil, herring oil, menhaden oil and sardine oil. Examples of non-drying oils are coconut oil, castor oil, cottonseed oil, peanut oil, and olive oil. Where the oil per se is employed, it becomes necessary, as is well known in the art, to first convert the oil to a monohydroxy ester or polyhydroxy ester by alcoholysis before adding the acid or acid anhydride and esterifying. Examples of polyols which may be used in the alcoholysis reaction include glycerine, 1,1,1-trimethylolethane, 1,1,1-trimethylolpropane and pentaerythritol. The average functionality of the polyol used in the alcoholysis reaction should be at least 2 hydroxyl groups per molecule. It is preferred that the average functionality be about 3 hydroxyl groups per molecule. When the polyol has an average functionality significantly greater than 3, it is preferred that monocarboxylic acid be added in an amount which would reduce the average functionality to about 3 hydroxyl groups per molecule. The monocarboxylic acid may be added during the alcoholysis reaction or during formation of the alkyd resin. For example, when pentaerythritol is employed, one molar part monocarboxylic acid may be added per mole pentaerythritol to reduce the functionality of the resulting product to about 3 hydroxyl groups per molecule.

Synthetic alcoholysis products of drying oil, semi-drying oil, non-drying oil or a mixture thereof may be used in lieu of all or part of the natural oil. Such synthetic alcoholysis products are well known in the art and are prepared by reacting polyol having a functionality greater than 2 hydroxyl groups per molecule with fatty acid. Preferably the fatty acid, including mixtures of fatty acids, should comprise enough drying fatty acid or semi-drying fatty acid so that the alkyd resin will possess satisfactory drying properties. Usually at least half of the fatty acid is drying fatty acid, semi-drying fatty acid or a mixture thereof. The principles respecting the average hydroxyl functionality of the synthetic alcoholysis product are the same as for the alcoholysis reaction product heretofore discussed. As used herein, the term "fatty acid" refers to monocarboxylic organic acid derived from natural fats and oils or their synthetic equivalents.

Acidolysis of the drying oil, semi-drying oil, non-drying oil or a mixture thereof may also be employed. When so used, the polyol is added during formation of the alkyd resin to compensate for the carboxyl groups of the acidolysis reaction product.

The oil length of the alkyd resin, expressed in percent by weight, is defined by the following equation:

$$\text{Oil Length} = \frac{\text{weight of oil charged}}{\text{theoretical weight of finished alkyd}} \times 100$$

The alkyd resins used in the present invention generally have an oil length in the range of from about 30 to about 65 percent. Usually the oil length is in the range of from about 35 to about 55 percent. From about 40 to about 50 percent is preferred.

The number average molecular weight of the essentially nitrogen-free polyester diol used in preparing the extended uralkyd resins of the invention is in the range of from about 800 to about 4000. Usually the number average molecular weight is in the range of from about 1000 to about 2000.

One type of polyester diol that can be used are those which may be prepared by the polyesterification of organic dicarboxylic acids or acid anhydrides with organic diols. Usually the dicarboxylic acids, acid anhydrides and diols are aliphatic or aromatic dibasic acids, anhydrides and diols. Examples of suitable dicarboxylic acids include succinic acid, glutaric acid, adipic acid, pimelic acid, suberic acid, azelaic acid, sebacic acid, phthalic acid, isophthalic acid, terephthalic acid, tetrahydrophthalic acid, hexahydrophthalic acid, chlorendic acid, tetrachlorophthalic acid, muconic acid, glutaconic acid and like acids containing up to about 12 carbon atoms. Maleic acid, fumaric acid, muconic acid, glutaconic acid and like acids are sometimes included. Examples of suitable acid anhydrides include phthalic anhydride and chlorendic anhydride. Maleic anhydride is sometimes included. Acids of higher functionality can be utilized if they are reacted with monobasic alcohol to reduce the average functionality to 2 carboxyl groups per molecule. Examples of suitable diols include ethylene glycol, propylene glycol, trimethylene glycol, diethylene glycol, 1,3-butanediol, 1,4-butanediol, 2,3-butanediol, neopentyl glycol, triethylene glycol, 1,6-hexanediol, dipropylene glycol, tetraethylene glycol, 2,2-dimethyl-3-hydroxypropyl 2,2 dimethyl-3-hydroxypropionate, hydrogenated Bisphenol A, cyclohexanediol, and dimethylolcyclohexane. Usually the diols contain from about 2 to about 12 carbon atoms. Polyols of higher functionality can be utilized if they are reacted with monobasic acid to reduce the average functionality to 2 hydroxyl groups per molecule.

Another type of polyester diol that can be used are the polylactone diols. These products may be formed by the reaction of a lactone with diols. Such products are described in U.S. Pat. No. 3,169,945, which is incorporated herein by reference.

The preferred lactones used in preparing the polylactone diols are the $\epsilon$-lactones. Especially preferred is $\epsilon$-caprolactone. Examples of polycaprolactone diols satisfactory for use in the invention are the reaction products of $\epsilon$-caprolactone and diethylene glycol having number average molecular weights of about 830 (Niax Polyol PCP-0210; Union Carbide Corporation), of about 1250 (Niax Polyol PCP-0230; Union Carbide Corporation) and of about 2000 (Niax Polyol PCP-0240; Union Carbide Corporation). Another example of a polycaprolactone diol which may be used is the reaction product of $\epsilon$-caprolactone and neopentyl glycol having a number average molecular weight of about 1250 (Niax Polyol PCP-0231; Union Carbide Corporation).

The diisocyanates used in the present invention usually contain from about 3 to about 36 carbon atoms. Generally, the diisocyanate contains from about 8 to about 15 carbon atoms. Examples of suitable diisocyanates include trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenylether and 2,3-bis(8-isocyanatooctyl)-4-octyl-5-hexylcyclohexene. Mixtures of diisocyanates may be used.

The preferred diisocyanate is toluene diisocyanate, which is a mixture usually comprising about 80 percent 2,4-tolylene diisocyanate and about 20 percent 2,6-tolylene diisocyanate, although the proportions can vary somewhat.

The polyester diol extended uralkyd resin of the invention is prepared by reacting the alkyd resin, the essentially nitrogen-free polyester diol and the diisocyanate. The alkyd resin generally constitutes from about 80 to about 94 percent by weight of these three reactants; from about 85 to about 91 percent by weight is preferred. The essentially nitrogen-free polyester diol usually constitutes from about 3 to about 10 percent by weight of the same three reactants; from about 4 to about 6 percent by weight is preferred. The diisocyanate typically constitutes from about 3 to about 10 percent by weight of the three reactants; from about 4 percent to about 8 percent is preferred.

The diisocyanate may in some cases by reacted with the essentially nitrogen-free polyester diol and the reaction product then reacted with the alkyd resin. It is preferred that the diisocyanate be concurrently reacted with the alkyd resin and the polyester diol.

The amount of polyester diol extended uralkyd resin present in the polymerizable coating compositions of the invention is subject to wide variation. Such uralkyd resin is ordinarily present in an amount in the range of from about 25 percent 100 percent by weight of the binder of the coating composition. An amount in the range of from about 35 to about 100 percent is typical. From about 45 to about 100 percent by weight of the binder is preferred. When a crosslinking agent is a component of the binder, the uralkyd resin is usually present in an amount in the range of from about 25 percent to about 95 percent by weight of the binder. From about 60 percent to about 95 percent by weight of the binder is preferred.

The coating compositions of the invention typically contain one or more volatile organic solvents. Mixtures of such solvents may be used when desired. Examples of suitable solvents include acetone, methyl ethyl ketone, methyl isobutyl ketone, methyl alcohol, ethyl alcohol, propyl alcohol, isopropyl alcohol, butyl alcohol, sec-butyl alcohol, tert-butyl alcohol, amyl alcohol, hexyl alcohol, 2-ethylhexyl alcohol, 2-methoxyethanol, 2-ethoxyethanol, 2-butoxyethanol, 2-ethoxyethyl acetate, 2-ethylhexyl acetate, aliphatic hydrocarbons, aromatic hydrocarbons, benzene, toluene and xylene.

Pigments are optional ingredients which are often included in the coating composition. Examples of opacifying pigments include titanium dioxide (rutile or anatase), zinc oxide, zirconium oxide, zinc sulfide and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow, toluidine red, aluminum powder and aluminum flakes. Examples of reactive pigments include barium metaborate, strontium chromate, lead chromate and zinc metal. Examples of extender pigments include silica, barytes, calcium carbonate, barium sulfate, talc, aluminum silicates, sodium aluminum silicates, potassium aluminum silicates and magnesium silicate. A single pigment may be used or mixtures of pigments may be employed. When used, the pigment is generally present in an amount in the range of from about 1 percent to about 45 percent by weight of the coating composition. From about 8 percent to about 15 percent by weight is typical.

Dyes and tints may optionally be included in the coating composition in conventional amounts.

Another optional ingredient is resinous pigment dispersant or grinding vehicle. There are many resinous dispersants which are commercially available for that purpose. These dispersants are used in the manner and in amounts known to the art.

Conventional plasticizers such as dibutyl phthalate, butyl benzyl phthalate, diisooctyl phthalate, decyl butyl phthalate, diisooctyl adipate, dibutyl sebacate, butyl benzoate, triisooctyl trimellitate, n-octyl n-decyl trimellitate, and tricresyl phosphates and flow promoters such as phenyl benzoate, dibenzyl ketone, benzyl methyl ketone and the like may also be optionally included in amounts customary in the art.

Any of the conventional viscosity control agents may be optionally employed in the composition. The preferred materials are resinous or polymeric viscosity control agents. Many of these resinous materials are available. Illustrative of such materials are cellulose acetate butyrate and the like. The use of such resinous or polymeric viscosity control agents is advantageous in that it permits the mixture to be prepared in the form of a viscous mass or syrup having sufficient viscosity to remain in place on the substrate until drying is effected. These viscosity control agents are used in the manner and in amounts known to the art.

The coating compositions may optionally contain a crosslinking agent such as aminoplast resin, urea-aldehyde resin or blocked polyisocyanate resin. When present, such crosslinking agents generally constitute from about 5 to about 40 percent by weight of the binder of the coating composition. From about 5 percent to about 30 percent by weight is preferred.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexaethyl ether of hexamethylolmelamine and polymeric butylated melamine formaldehyde resins.

Urea-aldehyde crosslinking agents may be prepared by reacting a urea and an aldehyde to the resol stage and thereafter alkylating with an alcohol under acidic conditions to provide an alkylated urea-aldehyde resin. An example of a suitable urea-aldehyde crosslinking agent is butylated urea-formaldehyde resin.

The blocked polyisocyanate which may be employed as the crosslinking agent may be any polyisocyanate where the isocyanate groups have been reacted with a compound so that the resultant blocked polyisocyanate is stable to hydroxyl groups at room temperature but reactive with hydroxyl groups at elevated temperatures, usually in the range of from about 90° C. to about 300° C. In the preparation of the blocked polyisocyanate, any suitable organic polyisocyanate may be used. The diisocyanates heretofore described with respect to the formation of the uralkyd resin are representative examples of polyisocyanates which may be employed. Polyisocyanates of higher isocyanate functionality may be used. Examples of these are tris(4-isocyanatophenyl)methane, 1,3,5-triisocyanatobenzene, 2,4,6-triisocyanatotoluene, 1,3,5-tris(6-isocyanatohexyl)biuret, bis (2,5-diisocyanato-4-methylphenyl)methane and polymerized polyisocyanates such as diisocyanatotoluene dimers and trimers and the like.

In addition, the organic polyisocyanate may be prepolymer derived from a polyol including polyether polyol or polyester polyol, including polyethers which are reacted with excess polyisocyanates to form isocyanate terminated prepolymers may be simple polyols such as glycols, e.g., ethylene glycol and propylene glycol, as well as other polyols such as glycerol, trimethylolpropane, hexanetriol, pentaerythritol, and the like, as well as monoethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butanediol, 1,3-butanediol, 1,6-hexanediol, and their mixtures; glycerol, trimethylolethane, trimethylpropane, 1,2,6-hexanetriol, polypentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic or aromatic alkyl monoalcohol may be used as a blocking agent in accordance with the present invention, such as, for example, aliphatic alcohols, such as methyl, ethyl, chlorethyl, propyl, butyl, amyl, hexyl, heptyl, octyl, nonly, 3,3,5-trimethyhexanol, decyl, and lauryl alcohols, and the like; the cycloaliphatic alcohols such as, for example, cyclopentanol, cyclohexanol, and the like, the aromatic-alkyl alcohols, such as phenylcarbinol, methylphenylcarbinol, and the like. Minor amounts of even higher molecular weight relatively non-volatile monoalcohols may be used, if desired, to serve as plasticizers in the coatings provided by this invention.

Additional blocking agents include hydroxyl amines such as ethanolamine and oximes such as methyl ethyl ketone oxime, acetone oxime and cyclohexanone oxime.

The organic polyisocyanate-blocking agent adduct is formed by reacting a sufficient quantity of alcohol with the organic polyisocyanate to insure that no free isocyanate groups are present. The reaction between the organic polyisocyanate and the blocking agent is exothermic; therefore, the polyisocyanate and the blocking agent are preferably admixed at temperatures no higher than 80° C. and, preferably, below 50° C. to minimize the exotherm effect.

The listing of optional ingredients discussed above is by no means exhaustive. Other ingredients may be employed in their customary amounts for their customary purposes so long as they do not seriously interfere with good coatings practice or the fast drying and formation of flexible films which are properties characteristic of the invention.

The coating compositions of the invention are usually prepared by simply admixing the various ingredients. Although the mixing is usually accomplished at room temperature, elevated temperatures are sometimes used. The maximum temperature which is usable depends upon the heat stability of the ingredients. Temperatures above about 150° C. are only rarely employed.

The coating compositions of the invention are generally used to form adherent coatings on substrates. The substrate is coated with the coating composition using substantially any technique known to the art. These include spraying, curtain coating, dipping, roller applicatiun, printing, brushing, drawing and extrusion.

The applied coatings may be cured in various ways at temperatures of from about 20° C. to about 260° C. When a crosslinking agent is present, the coatings are usually cured by baking. The baking temperature may vary widely, but it is usually in the range of from about 80° C. to about 150° C. Similarly, the baking times may be subject to wide variation. Baking times of from about 10 minutes to about 45 minutes are usual. As a rule, an increase in baking temperature permits a decrease in baking time.

In the preferred embodiment, the applied coatings are air cured at ordinary ambient temperatures. The alkyd resin used in preparing the polyester diol extended uralkyd resin present in such air drying coating compositions is prepared with drying oil, semi-drying oil or a mixture thereof. Non-drying oil may be used in conjunction with the drying oil or semi-drying oil, but it should be used only in those amounts as will not seriously interfere with the air drying properties of the alkyd resin. The iodine value of the oil employed is usually about 130 or higher.

The thickness of dried or baked coatings of the coating compositions of the invention are subject to wide variation. Usually such thicknesses are in the range of from about 0.001 millimeter to about 0.3 millimeter. More often, they are in the range of from about 0.005 millimeter to about 0.2 millimeter. Typically, they are in the range of from about 0.012 millimeter to about 0.15 millimeter. When the coating composition is a printing ink, the dried coatings usually have thicknesses in the range of from about 0.001 millimeter to about 0.03 millimeter.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

In the illustrative examples which follow, all parts are parts by weight and all percentages are percentages by weight unless otherwise specified. Additionally, the test for clear alcoholysis referred to in the examples is conducted by dissolving one part by volume of a sample of the reaction mixture in four parts by volume of denatured ethanol, cooling the solution to room temperature and observing whether the cooled solution is hazy or clear. A clear alcoholysis is said to occur when the cooled solution is clear.

EXAMPLE I

A first reactor equipped with a thermometer, a heater, an agitator and a condenser set for azeotropic distillation is charged with 2138 parts soya oil and 430 parts glycerine. The charge is heated to 390° F. (199° C.) and then 0.94 part litharge is added. Over a period of one hour and twenty-five minutes the reaction mixture is heated to 443° F. (228° C.) and held at this temperature. At the end of this period, a clear alcoholysis is found to have been obtained. Five minutes later, with the temperature at 443° F. (228° C.), the heater is turned off and the following materials are added in sequence over a period of twenty-five minutes: isophthalic acid, 1572 parts; glycerine, 412 parts; and xylene, 180 parts. The added materials have caused the temperature of the reaction mixture to drop to 290° F. (143° C.). The heater is then turned on and the reaction mixture is heated over a period of two hours and fifty minutes to 407° F. (208°

C.) with azeotropic distillation and the separation of water. At the end of this period, the heater is turned off and the reaction mixture is allowed to cool from 407° F. (208° C.) to room temperature. Sixteen hours after turning the heater off, the heater is turned on and the reaction mixture is heated to 438° F. (226° C.) over a period of two hours and forty-five minutes while azeotropic distillation and separation of water are conducted. At the end of this period the heater is turned off, a homogeneous, clear solution is observed and a total of 315 parts water has been removed. The acid value is found to be 19.8 and the hydroxyl number is found to be 117 on a sample of material taken from the reactor. Two thousand eight hundred parts xylene is then added carefully, with cooling under reflux, to the reaction mixture to form an air drying, oil modified alkyd resin solution having a solids content of 59.4 percent and a Gardner-Holdt viscosity of P+.

A second reactor equipped with a thermometer, a heater, an agitator, a source of nitrogen, a condenser set for total reflux and a drying tube is charged with 3305 parts of the above air drying, oil modified alkyd resin solution. A nitrogen blanket is applied and 100 parts poly-ε-caprolactone-diethylene glycol diol (Niax Polyol PCP-0240) is added. Five minutes later the heater is turned on and the reaction mixture is heated over a period of twenty-five minutes to 138° F. (59° C.). The heater is then turned off. The temperature is in the range of from 138° F. (59° C.) to 141° F. (61° C.) for the next ten minutes. Over a period of fifteen minutes, while the temperature is in the range of from 141° F. (61° C.) to 147° F. (64° C.), 127 parts toluene diisocyanate is added. The heater is then turned on and the reaction mixture is heated to 188° F. (87° C.). The reaction mixture is held at temperatures in the range of from 185° F. (85° C.) to 188° F. (87° C.). Two hours and fifty minutes after the heater is turned on, it is determined that substantially all ioscyanate groups have been reacted. This determination is made by observing that there is no isocyanate absorption at the 4.5 micron region of an infrared curve of the reactor material. The heater is then turned off and the reaction mixture is thinned with 840 parts xylene and filtered to produce a polyester diol extended uralkyd resin solution having an acid value of 7.57, a density of 8.19 pounds per gallon (0.981 grams per cubic centimeter), a solids content of 50.5 percent, a Gardner-Holdt viscosity of Z3- and a Gardner color of 10–11.

EXAMPLE II

A reactor equipped as the first reactor in Example I is charged with 2138 parts soya oil and 430 parts glycerine. The charge is heated to 390° F. (199° C.) and then 0.94 part litharge is added. Over a period of one hour and twenty minutes the reaction mixture is heated to 445° F. (229° C.) and held at this temperature. At the end of this period of clear alcoholysis is found to have been obtained. Five minutes later, with the temperature at 445° F. (229° C.), the heater is turned off and the following materials are added in sequence over a period of fifteen minutes: isophthalic acid, 1572 parts; glycerin, 412 parts; and xylene, 180 parts. The added materials have caused the temperature of the reaction mixture to drop to 312° F. (156° C.). The heater is then turned on and the reaction mixture is heated over a period of two hours and fifty minutes to 395° F. (202° C.) with azeotropic distillation and the separation of water. At the end of this period, the heater is turned off and the reaction mixture is allowed to cool from 395° F. (202° C.) to room temperature. Fifteen hours and forty-five minutes after turning the heater off, the heater is turned on and the reaction mixture is heated to 420° F. (216° C.) over a period of three hours and five minutes while azeotropic distillation and separation of water are conducted. At the end of this period the heater is turned off, a homogeneous, clear solution is observed and a total of 316 parts water has been removed. The acid value is found to be 19.4 and the hydroxyl number is found to be 117 on a sample of material taken from the reactor. Two thousand seven hundred seventy-five parts xylene is then added carefully, with cooling under reflux, to the reaction mixture to form an air drying, oil modified alkyd resin solution having an acid value of 10.9, a density of 8.31 pounds per gallon (0.996 grams per cubic centimeter), a solids content of 60.1 percent, a Gardner-Holdt viscosity of M and a Gardner color of 4+.

A reactor equipped as the second reactor in Example I is charged with 3292 parts of the above air drying, oil modified alkyd resin solution. A nitrogen blanket is applied and 100 parts poly-ε-caprolactone-diethylene glycol dio (Niax Polyol PCP-0240) is added. The reaction mixture is heated over a period of twenty minutes to 140° F. (60° C.). The heater is then turned off. Over a period of ten minutes, while the temperature is in the range of from 140° F. (60° C.) to 150° F. (66° C.), 127 parts toluene diisocyanate is added. Twenty minutes later when the temperature is 148° F. (64° C.), the heater is turned on and the reaction mixture is heated to 185° F. (85° C.). One hour and fifteen minutes after the heater is turned on, it is turned off and the reaction mixture is allowed to cool to room temperature. Sixteen hours after the heater is turned off, the heater is turned on and the reaction mixture is heated to 146° F. (63° C.) over a period of one hour. It is then determined by infrared analysis in the manner of Example I that substantially all isocyanate groups have been reacted. Ten minutes later when the temperature is 159° F. (71° C.) the heater is turned off and the reaction mixture is thinned with 885 parts xylene and filtered to form a polyester diol extended uralkyd resin solution having an acid value of 7.2, a density of 8.14 pounds per gallon (0.975 grams per cubic centimeter), a solids content of 49.5 percent, a Gardner-Holdt viscosity of W and a Gardner color of 5+.

EXAMPLE III

A reactor equipped as the second reactor in Example I is charged with 2987 parts of the air drying, oil modified alkyd resin solution produced in Example II. A nitrogen blanket is applied and over a period of five minutes 136 parts of heated polyol-ε-carprolactonediethylene glycol diol (Niax Polyol PCP-0240) is added. The reaction mixture is heated over a period of twenty-five minutes to 131° F. (55° C.). The heater is then turned off. Over a period of twenty minutes, while the temperature is in the range of from 131° F. (55° C.) to 139° F. (59° C.), 115 parts toluene diisocyanate is added. The heater is turned on and the reaction mixture is heated over a period of thirty-five minutes to 250° F. (121° C.). At the end of this period the heater is turned off. Seventy minutes later, with the temperature at 184° F. (84° C.), the heater is turned on. Ten minutes after turning the heater on and while the temperature is 183° F. (84° C.), it is determined by infrared analysis in the manner of Example I that substantially all isocyanate groups have been reacted. The heater is turned off and the reaction mixture is thinned with 845 parts xylene and filtered to produce a polyester diol extended uralkyd resin solution having an acid value of 7.7, a density of 8.12 pounds per gallon (0.973 grams per cubic centimeter), a solids content of 49.5 percent, a Gardner-Holdt viscosity of V-W and a Gardner color of 5-6.

EXAMPLE IV

A reactor equipped as the first reactor in Example I is charged with 2471 parts soya oil and 502 parts glycerine. The charge is heated to 390° F. (199° C.) and then 1.09 parts litharge is added. Over a period of forty-five minutes the reaction mixture is heated to 442° F. (228° C.) and held at that temperature. At the end of this period, a clear alcoholysis is found to have been obtained. Five minutes later, with the temperature at 441° F. (227° C.), the heater is turned off and the following materials are added in sequence over a period of fifteen minutes: isophthalic acid, 1817 parts; glycerine, 481 parts; xylene, 100 parts. The added materials have caused the temperature of the reaction mixture to drop to 310° F. (154° C.). The heater is then turned on and the reaction mixture is heated over a period of five hours to 405° F. (207° C.) with azeotropic distillation and the separation of water. At the end of this period, the heater is turned off and the reaction mixture is allowed to cool from 405° F. (207° C.) to room temperature. Fifteen hours and fifty-five minutes after turning the heater off, the heater is turned on and the reaction mixture is heated to 420° F. (216° C.) over a period of two hours and five minutes while azeotropic distillation and the separation of water are conducted. At the end of this period, the heater is turned off, a homogeneous, clear solution is observed and a total of 315 parts water has been removed. The acid value is found to be 20.6 and the hydroxyl number is found to be 121 on a sample of material taken from the reactor. Three thousand fifty parts xylene is then added carefully, with cooling under reflux to the reaction mixture to form an air drying, oil modified alkyd resin solution having an acid value of 11.2, a density of 8.30 pounds per gallon (0.995 grams per cubic centimeter), a solids content of 60.7 percent, a Gardner-Holdt viscosity of O-P and a Gardner color of 5+.

A reactor equipped as the second reactor in Example I is charged with 3803 parts of the above air drying, oil modified alkyd resin solution. The charge is heated to 137° F. (58° C.), the heater is turned off and 117 parts of a polyester diol having a number average molecular weight of about 1034 formed from 1,4-butanediol and adipic acid (Formrez F13-35; Witco Chemical Corporation) is added. Twenty minutes later the temperature of the reaction mixture is 130° F. (54° C.). Over a period of five minutes while the temperature of the reaction is in the range of from 130° F. (54° C.) to 132° F. (56° C.), 148 parts toluene diisocyanate is added. The heater is then turned on and over a period of thirty-five minutes the reaction mixture is heated to 186° F. (86° C.). The temperature of the reaction mixture is maintained in the range of from 182° F. (83° C.) to 186° F. (86° C.) for the next one hour and thirty minutes. The heater is then turned off and the reaction mixture is allowed to cool to room temperature. Fourteen hours and ten minutes after the heater is turned off, the heater is turned on and the reaction mixture is heated to 84° F. (29° C.) over a period of forty minutes. At that time it is determined by infrared analysis in the manner of Example I that substantially all isocyanate groups have been reacted. The heater is turned off and the reaction mixture is thinned with 1425 parts xylene and filtered to form a polyester diol extended uralkyd resin solution having an acid value of 8.2, a density of 8.19 pounds per gallon (0.981 grams per cubic centimeter), a solids content of 45.6 percent, a Gardner-Holdt viscosity of M and a Gardner color of 5.

EXAMPLE V

A mixing tank equipped with an agitator is charged with 93.53 parts of the polyester diol extended uralkyd resin solution of Example II and 48.56 parts VM&P naphtha. The charged materials are admixed and then 6.54 parts organic amine bentonite clay (Bentone 38; National Lead Industries, Inc.) is added. The materials are admixed for five minutes, then 2.18 parts propylene carbonate is added. The mixture is admixed for five minutes and then 7.57 parts calcium drier containing 6 percent calcium, 84.17 parts red iron oxide pigment, and 9.37 parts uncompressed silica pigment are added under agitation. The materials are blended until uniform.

A letdown tank equipped with an agitator is charged under agitation with 514.85 parts of the polymeric diol extended uralkyd resin solution of Example II, 9.28 parts tricresyl phosphate, 36.46 parts secondary butyl alcohol, 7.57 parts lead drier containing 36 percent lead, 2.27 parts cobalt drier containing 12 percent cobalt and 0.95 part methyl ethyl ketoxime. The charged materials are blended until uniform.

The material from the mixing tank is passed through a zircoa mill into the blended materials in the letdown tank. The zircoa mill is washed out with 28.31 parts VM&P naptha which is also added to the letdown tank. Upon mixing to a uniform blend, the resulting product is a red, air drying enamel.

We claim:

1. A polyester diol extended, ungelled, isocyanate-free uralkyd resin comprising the reaction product of
   a. from about 60 to about 94 percent by weight of oil modified alkyd resin having an oil length of from about 30 to about 65 percent;
   b. from about 3 to about 20 percent by weight of essentially nitrogen-free polyester diol having a number average molecular weight in the range of from about 800 to about 4000; and
   c. from about 3 to about 20 percent by weight of diisocyanate.

2. The polyester diol extended, ungelled, isocyanate-free uralkyd resin of claim 1 wherein said oil modified alkyd resin comprises the reaction product of
   a. polyfunctional alcohol;
   b. polyfunctional acid or acid anhydride; and
   c. the polyol alcoholysis reaction product of drying oil, semi-drying oil, non-drying oil or a mixture thereof.

3. A polyester diol extended, ungelled, isocyanate-free uralkyd resin comprising the reaction product of
   a. from about 80 to about 94 percent by weight of air drying oil modified alkyd resin having an oil length of from about 30 to about 65 percent;
   b. from about 3 to about 10 percent by weight of essentially nitrogen-free polyester diol having a number average molecular weight in the range of from about 800 to about 4000; and
   c. from about 3 to about 10 percent by weight of diisocyanate.

4. The polyester diol extended uralkyd resin of claim 3 wherein said air drying, oil modified alkyd resin comprises the reaction product of
 a. polyfunctional alcohol;
 b. polyfunctional acid or acid anhydride; and
 c. the polyol alcoholysis reaction product of drying oil, semi-drying oil or a mixture thereof.

5. The polyester diol extended uralkyd resin of claim 4 wherein the polyol used in preparing said polyol alcoholysis product has an average functionality of about 3 hydroxyl groups per molecule.

6. The polyester diol extended uralkyd resin of claim 5 wherein said polyol is the reaction product of polyol having an average functionality greater than 3 hydroxyl groups per molecule and fatty acid.

7. The polyester diol extended uralkyd resin of claim 5 wherein said polyol is glycerine.

8. The polyester diol extended uralkyd resin of claim 3 wherein said air drying, oil modified alkyd resin comprises the reaction product of
 a. polyfunctional alcohol;
 b. polyfunctional acid or acid anhydride; and
 c. polyol having an average functionality of about 2 hydroxyl groups per molecule comprising the reaction product of polyol having an average functionality greater than 2 hydroxyl groups per molecule and fatty acid.

9. The polyester diol extended uralkyd resin of claim 3 wherein said polyester diol is the reaction product of a diol and a diacid.

10. The polyester diol extended uralkyd resin of claim 3 wherein said polyester diol is the reaction product of 1,4-butanediol and adipic acid.

11. The polyester diol extended uralkyd resin of claim 3 wherein said polyester diol is polylactone diol.

12. The polyester diol extended uralkyd resin of claim 11 wherein said polylactone diol is poly-$\epsilon$-caprolactone diol.

13. The polyester diol extended uralkyd resin of claim 12 wherein said poly-$\epsilon$-caprolactone diol is the reaction product of $\epsilon$-caprolactone and diethylene glycol.

14. The polyester diol extended uralkyd resin of claim 3 wherein said diisocyanate is 1-isocyanatomethyl-5-isocyanato-1,3,3-trimethylcyclohexane, 2,4-diisocyanatotoluene, 2,6-diisocyanatotoluene, bis(4-isocyanatocyclohexyl)-methane, bis(4-isocyanatophenyl)methane, 1,6-diisocyanatohexane or mixtures thereof.

15. The polyester diol extended uralkyd resin of claim 3 wherein said diisocyanate comprises a mixture of 2,4-diisocyanatotoluene and 2,6-diisocyanatotoluene.

16. A method of preparing a polyester diol extended, ungelled, isocyanate-free uralkyd resin comprising reacting
 a. from about 60 to about 94 percent by weight of oil modified alkyd resin having an oil length of from about 30 to about 65 percent;
 b. from about 3 to about 20 percent by weight of essentially nitrogen-free polyester diol having a number average molecular weight in the range of from about 800 to about 4000; and
 c. from about 3 to about 20 percent by weight of diisocyanate.

17. A method of preparing a polyester diol extended, ungelled, isocyanate-free uralkyd resin comprising reacting
 a. from about 80 to about 94 percent by weight of air drying, oil modified alkyd resin having an oil length of from about 30 to about 65 percent;
 b. from about 3 to about 10 percent by weight of essentially nitrogen-free polyester diol having a number average molecular weight in the range of from about 800 to about 4000; and
 c. from about 3 to about 10 percent by weight of diisocyanate.

18. In a coating composition having a binder, the improvement wherein said binder comprises from about 25 to about 100 percent by weight of a polyester diol extended, ungelled, isocyanate-free uralkyd resin comprising the reaction product of
 a. from about 60 to about 94 percent by weight of oil modified alkyd resin having an oil length of from about 30 to about 65 percent;
 b. from about 3 to about 20 percent by weight of essentially nitrogen-free polyester diol having a number average molecular weight in the range of from about 800 to about 4000; and
 c. from about 3 to about 20 percent by weight of diisocyanate.

19. The coating composition of claim 18 wherein
 a. said oil modified alkyd resin comprises the reaction product of
  (1) polyfunctional alcohol,
  (2) polyfunctional acid or acid anhydride, and
  (3) the glycerine alcoholysis reaction product of a drying oil, semi-drying oil, non-drying oil or a mixture thereof.

20. The coating composition of claim 18 wherein said binder comprises from about 25 percent to about 95 percent by weight of said polyester diol extended uralkyd resin and from about 5 percent to about 40 percent by weight of crosslinking agent.

21. In a coating composition having a binder, the improvement wherein said binder comprises from about 25 to about 100 percent by weight of a polyester diol extended, ungelled, isocyanate-free uralkyd resin comprising the reaction product of
 a. from about 80 to about 94 percent by weight of air drying, oil modified alkyd resin having an oil length of from about 30 to about 64 percent;
 b. from about 3 to about 10 percent by weight of essentially nitrogen-free polyester diol having a number average molecular weight in the range of from about 800 to about 4000; and
 c. from about 3 to about 10 percent by weight of diisocyanate.

22. The coating composition of claim 21 wherein
 a. said air drying, oil modified alkyd resin comprises the reaction product of
  (1) polyfunctional alcohol,
  (2) polyfunctional acid or acid anhydride, and
  (3) the glycerine alcoholysis reaction product of a drying oil, semi-drying oil or a mixture thereof;
 b. said polyester diol is poly-$\epsilon$-caprolactone diol; and
 c. said diisocyanate is toluene diisocyanate.

23. The coating composition of claim 22 wherein said poly-$\epsilon$-caprolactone diol is poly-$\epsilon$-caprolactone-diethylene glycol diol.

* * * * *

UNITED STATES PATENT AND TRADEMARK OFFICE
CERTIFICATE OF CORRECTION

PATENT NO. : 4,222,911

DATED : September 16, 1980

INVENTOR(S) : Roger M. Christenson; J. Alden Erikson

It is certified that error appears in the above-identified patent and that said Letters Patent are hereby corrected as shown below:

Column 14, line 47, "64" should be --65--.

Signed and Sealed this

Twenty-seventh Day of January 1981

[SEAL]

Attest:

Attesting Officer

RENE D. TEGTMEYER

Acting Commissioner of Patents and Trademarks